United States Patent
Le

(10) Patent No.: US 9,352,914 B2
(45) Date of Patent: May 31, 2016

(54) PNEUMATIC TUBE CARRIER SYSTEM AND METHOD

(71) Applicant: Ngoc Minh Le, Joppa, MD (US)

(72) Inventor: Ngoc Minh Le, Joppa, MD (US)

(*) Notice: Subject to any disclaimer, the term of this patent is extended or adjusted under 35 U.S.C. 154(b) by 113 days.

(21) Appl. No.: 14/254,122

(22) Filed: Apr. 16, 2014

(65) Prior Publication Data

US 2015/0298919 A1    Oct. 22, 2015

(51) Int. Cl.
*B65G 51/24* (2006.01)
*B65G 51/32* (2006.01)

(52) U.S. Cl.
CPC .............. *B65G 51/32* (2013.01); *B65G 51/24* (2013.01)

(58) Field of Classification Search
USPC ................. 406/181, 182; 198/442; 137/876
See application file for complete search history.

(56) References Cited

U.S. PATENT DOCUMENTS

| | | | | |
|---|---|---|---|---|
| 3,536,098 A | * | 10/1970 | Cunningham | B65G 53/56 137/876 |
| 3,762,664 A | | 10/1973 | Loveless | |
| 4,058,274 A | | 11/1977 | Hochradel et al. | |
| 4,516,888 A | * | 5/1985 | Kardinal | B65G 51/34 406/182 |
| 4,529,335 A | | 7/1985 | Hilbert et al. | |
| 4,938,637 A | * | 7/1990 | Lybecker | B65G 53/56 406/122 |
| 5,165,826 A | | 11/1992 | Egbert | |
| 5,181,806 A | | 1/1993 | Grosswiller et al. | |
| 5,226,759 A | * | 7/1993 | Hilmer | B65G 53/56 406/182 |
| 5,805,454 A | | 9/1998 | Valerino, Sr. et al. | |
| 5,896,297 A | | 4/1999 | Valerino, Sr. | |
| 5,931,611 A | * | 8/1999 | Worsham | A63B 47/04 406/182 |

(Continued)

FOREIGN PATENT DOCUMENTS

| | | |
|---|---|---|
| CA | 2024708 A1 | 3/1992 |
| EP | 0045626 A1 | 2/1982 |

(Continued)

OTHER PUBLICATIONS

Health Facilities Scotland, SHTM 08-04: Pneumatic tube systems, Part B, dated Nov. 2011, pp. 8-9, available at www.hfs.scot.nhs.uk/publications/1342097671-Part%20B%20Version%201.pdf.

(Continued)

*Primary Examiner* — Joseph Dillon, Jr.
(74) *Attorney, Agent, or Firm* — Kelley Drye & Warren LLP

(57) ABSTRACT

A pneumatic tube delivery system and method for simultaneously transporting pneumatic carriers across a plurality of sending and receiving stations connected via pneumatic tubing and diverters. The plurality of sending and receiving stations each comprises a pneumatic device to coordinate and direct the transportation of carriers through vacuum or pressure throughout the pneumatic tube system. One or more diverters in the pneumatic tube system may also comprise a pneumatic device for transporting carriers between two diverters. Each pneumatic device is only responsible for transporting a carrier though a single pneumatic tube sector within the system, enabling the pneumatic tube sectors to operate independently from one another. Accordingly, two or more carriers can be simultaneously transported within the pneumatic tube system. The diverter of the present invention for diverting carriers between pneumatic tube sectors may comprise at least one robotic arm connected to a movable tube for retaining the carrier and shifting the carrier within the diverter.

18 Claims, 9 Drawing Sheets

(56) References Cited

U.S. PATENT DOCUMENTS

| | | | |
|---|---|---|---|
| 6,048,086 A | 4/2000 | Valerino, Sr. | |
| 6,173,212 B1 | 1/2001 | Valerino, Sr. | |
| 6,202,004 B1 | 3/2001 | Valerino, Sr. | |
| 6,477,442 B1 | 11/2002 | Valerino, Sr. | |
| 6,516,810 B1 * | 2/2003 | Haul | B65G 51/02 131/108 |
| 6,659,693 B1 | 12/2003 | Perkins et al. | |
| 6,712,561 B1 | 3/2004 | Valerino, Sr. et al. | |
| 6,854,936 B2 * | 2/2005 | Dragon | B65G 47/642 193/31 A |
| 7,220,082 B1 | 5/2007 | Christian et al. | |
| 7,306,407 B1 | 12/2007 | Gromley et al. | |
| 7,309,192 B1 | 12/2007 | Gromley et al. | |
| 7,311,471 B1 | 12/2007 | Gromley et al. | |
| 7,311,472 B1 | 12/2007 | Gromley et al. | |
| 7,311,473 B1 | 12/2007 | Gromley et al. | |
| 7,311,475 B1 | 12/2007 | Gromley et al. | |
| 7,314,337 B1 | 1/2008 | Gromley et al. | |
| 7,314,338 B1 | 1/2008 | Gromley et al. | |
| 7,314,339 B1 | 1/2008 | Christian et al. | |
| 7,316,526 B1 | 1/2008 | Gromley et al. | |
| 7,318,690 B1 | 1/2008 | Gromley et al. | |
| 7,320,562 B1 | 1/2008 | Gromley et al. | |
| 7,341,406 B1 | 3/2008 | Gromley et al. | |
| 7,424,340 B2 | 9/2008 | Owens | |
| 7,686,547 B1 | 3/2010 | Gromley et al. | |
| 7,751,930 B2 | 7/2010 | Valerino, Sr. | |
| 7,935,081 B2 | 5/2011 | Flaker et al. | |
| 8,116,906 B2 | 2/2012 | Valerino, Sr. | |
| 8,267,622 B1 | 9/2012 | MacLean-Blevins et al. | |
| 8,641,329 B2 * | 2/2014 | Barrios | B65G 51/14 137/875 |
| 8,700,207 B2 | 4/2014 | Valerino, Sr. | |
| 2001/0056311 A1 | 12/2001 | Valerino, Sr. | |
| 2013/0204431 A1 | 8/2013 | Hoganson et al. | |
| 2014/0094962 A1 | 4/2014 | Valerino, Sr. | |
| 2015/0246773 A1 * | 9/2015 | Sundholm | B65F 1/0093 406/1 |

FOREIGN PATENT DOCUMENTS

| | | |
|---|---|---|
| EP | 0063096 A2 | 10/1982 |
| WO | WO9850297 A1 | 11/1998 |
| WO | WO2007147586 A1 | 12/2007 |

OTHER PUBLICATIONS

Eagle Pneumatics, Inc., Eagle Pneumatic Type I and Type II Stations, accessed on Mar. 26, 2014, available at www.eaglepneumatic.com/pdf/Type12-11005.pdf.

IAI America, Inc., RCS2CR-SA4C / 5C / 6C / 7C Cleanroom Slider Type 200V Servo Motor Linear Electric Actuator, accessed on Apr. 8, 2014, available at www.intelligentactuator.com/rcs2cr-sa4c-5c-60-7c-cleanroom-slider-type-200v-servo-motor-linear-electric-actuator/.

Breitbach, Lineaire actuators en controls, accessed on Apr. 8, 2014, available at www.breitbach-antriebstechnik.com/en/producten/Actuators/.

Cale Reese, The Ins and Outs of Single Axis Actuation, WTWH Media, LLC, dated Aug. 1, 2012, available at www.designworldonline.com/the-ins-and-outs-of-single-axis-actuation/#_.

Inteilidrives Inc., Rotary Actuator RTHPB-150, accessed on Apr. 8, 2014, available at www.intellidrives.com/rotary-tables-c-28.html/Rotary-Actuators-Belt-Drive/Rotary-Actuator-RTHPB150.

* cited by examiner

PNEUMATIC TUBE CARRIER SYSTEM AND METHOD

FIELD OF THE INVENTION

The invention generally relates to the field of pneumatic tube delivery systems, and more particularly, to a pneumatic tube delivery system and method for simultaneously transporting pneumatic carriers across a plurality of sending and receiving stations.

BACKGROUND OF THE INVENTION

In large institutional settings, such as hospitals, the dispensing and delivery of drugs has become a time consuming process. Transporting objects via pneumatic tubes is known to the art. Pneumatic delivery systems are used extensively for the rapid and efficient transportation of a wide variety of articles. These delivery systems are used in a number of business operations, including, but not limited to, banks, hospitals, office buildings, industrial plants, and transportation terminals.

A basic pneumatic tube system generally consists of tubing, a blower, a carrier, and stations to deliver medical products from point A to point B. A carrier is a reusable plastic container that holds and protects items sent through the pneumatic tube system. A blower is a large fan that moves carriers through the tubes via vacuum and pressure. Delivery stations are positioned throughout a facility to allow personnel to send and receive carriers. To send a payload in a carrier, an object is placed within a carrier, which is then transported to a desired destination within enclosed pneumatic tubing by air under either positive or negative pressure created by the blower. The interior of the closed tube and the outer dimension of the carrier form a seal so that the carrier can be propelled between the destinations by vacuum or positive air pressure.

Existing pneumatic tube systems generally comprise two different layouts: point-to-point and a more complex layout utilizing diverters. The existing point-to-point layout is not computerized, but uses a timer to send and received a carrier between two stations. Its major advantage is speed since the carrier is simply delivered from point A to point B. However, its major disadvantage is that it cannot transport carriers to multiple destinations.

The existing complex layout is meant to overcome the point-to-point system by increasing destination stations. For example, as shown in FIG. 1, a typical existing complex system 100 utilizes a plurality of stations 101a, 101b, 101c, and 101d interconnected using pneumatic tubing 102. The system 100 further utilizes diverters 112a and 112b, which are switching devices located between stations within the tube network that allow carriers to travel between any two delivery stations. The exemplary diverters 112a and 112b comprise flexible tubes 113a and 113b that are connected at their first ends 115a and 115b to tubing 111f and 111e, respectively. Flexible tubes 113a and 113b are connected at their second ends 114a and 114b to rails 116a and 116b, respectively. Flexible tubes 113a and 113b slide along rails 116a and 116b to align with the port of the desired tubing 111a, 111b, 111e and 111c, 111d, respectively. System 100 utilizes a single blower 110, which creates vacuum pressure either in the forward or reverse direction throughout the entire system 100. To transport a carrier 155a from station 101a to station 101b, the system 100 directs flexible tube 113a of diverter 112a to slide along rails 116a so that its second end 114a is aligned with tube 111a. Blower 110 creates a vacuum to pull the carrier via suction from station 101a, through tubing 111a and flexible tube 113a to tubing 111f. Next, the second end 114a of flexible tube 113a is aligned with tubing 111b, and blower 110 is switched to a pressure states to push the carrier from tubing 111f, through flexible tube 113a and tubing 111b to station 101b. A second carrier 155b may be transported from station 101c to station 101d in a similar manner. As is apparent, the current complex system's major advantage is the ability of transporting the carriers from a plurality of locations. However, its main limitation is that it can only deliver a single carrier per transaction. Since a single blower 110 is utilized, when carrier 155a is transported from station 101a to station 101b, a second carrier 155b cannot be transported from station 101c to station 101d at the same time. Thus, when a new carrier is received by the system, it needs to wait until the system completes the delivery of a carrier already in the system. Only when the carrier that is already in the system is transported to its desired destination can the system begin transporting the new carrier. This significantly prolongs the delivery time. Also, when a carrier is vacuumed from a station to a diverter, it needs to first wait for the system to switch to the correct pressured state before it can travel to its destination, further delaying delivery time. To increase the number of carriers to be transported through the system, current complex systems employ multiple zones. For instance, in order to transport five carriers at the same time, the pneumatic tube system needs five separate zones, resulting in five blowers or less. In addition, each such zone will require its own sending and receiving stations and tubing—increasing the amount of tubing used, the number of stations at the same location, and the required air abundance.

Thus, there is clearly a need for a system and method that eliminates such disadvantages by promoting faster travel time, increasing the number of transactions per zone, and reducing air abundance per zone.

SUMMARY OF THE INVENTION

An object of the invention is to overcome the drawbacks of previous inventions.

Another object of the invention is to provide a system and method that promote faster travel time, increase the number of transactions per zone, and reduce air abundance per zone.

Another object of the invention is to provide a system and method that provides a new type of diverter and station that overcome the drawbacks of previous inventions.

Presented herein is a pneumatic tube delivery system and method for simultaneously transporting pneumatic carriers across a plurality of sending and receiving stations connected via pneumatic tubing. The plurality of sending and receiving stations each comprises a pneumatic device to coordinate and direct the transportation of carriers through vacuum or pressure throughout the pneumatic tube system. In addition, one or more diverters in the pneumatic tube system may also comprise a pneumatic device for transporting a carrier between two diverters. Advantageously, the pneumatic tube system of the present invention does not use a central blower that controls the entire system. Accordingly, each pneumatic device is only responsible for transporting a carrier though a single pneumatic tube sector within the system allowing the pneumatic tube sectors to operate independently from one another. As such, two or more carriers can be simultaneously transported within the pneumatic tube system.

In one embodiment of the invention, a pneumatic tube carrier routing system is provided comprising a first station having a first pneumatic device, a diverter routably connected to the first station via a first pneumatic tube sector, and a second station comprising a second pneumatic device and routably connected to the diverter via a second pneumatic tube sector, wherein the first pneumatic device creates positive pressure in the first pneumatic tube sector to route a carrier from the first station to the diverter, wherein the diverter receives the carrier from the first pneumatic tube sector and shifts the carrier to be discharged at the second pneumatic tube sector, and wherein the second pneumatic device creates negative pressure in the second pneumatic tube sector to route said carrier from the diverter to the second station. The system may further comprise a system control module in signal communication with the first station, the diverter, and the second station configured to receive a command to route a carrier from the first station to the second station. The first and second pneumatic devices may comprise a fan, a blower, a compressor, a sound-proof air compressor, or the like. The diverter may also comprise a third pneumatic device to create positive or negative pressure in a third pneumatic tube sector routably connecting the diverter to at least one of a third station and a second diverter. The first and second stations may further comprise tag readers or optical sensors to capture information associated with carrier contents ID, carrier ID, sending user ID, sending station ID, receiving station ID, or a combination thereof. In addition, in order to track the carriers within the pneumatic tube system, the first and second pneumatic tube sectors may include a reader configured to capture information associated with a carrier ID as the carrier is transported through the pneumatic tube sectors.

In another embodiment of the invention, a pneumatic tube carrier routing system is provided comprising a first station having a first pneumatic device; and a diverter having a second pneumatic device, a first port leading to a first pneumatic tube sector routably connecting the diverter to the first station, and a second port leading to a second pneumatic tube sector routably connecting the diverter to at least one of a second station and a second diverter; wherein the first pneumatic device creates positive pressure in the first pneumatic tube sector to route a carrier from the first station to the diverter; wherein the diverter receives the carrier at the first port and shifts the carrier from the first port to the second port; and wherein the second pneumatic device creates positive pressure in the second pneumatic tube sector to route the carrier from the diverter to the at least one of the second station and the second diverter.

In yet another embodiment of the invention, a pneumatic tube carrier routing system is provided comprising a plurality of sending stations, each sending station comprising a pneumatic device; a plurality of receiving stations, each receiving station comprising a pneumatic device; a plurality of diverters routably connected to the plurality of sending and receiving stations via pneumatic tubing; and a system control module in signal communication with the plurality of sending stations, the plurality of diverters, and the plurality of receiving stations; wherein the system control module is configured to receive at least two commands to route at least two carriers from at least two sending stations to at least two receiving stations, wherein the system control module substantially simultaneously routes the at least two carriers from the at least two sending stations to the at least two receiving stations by selectively activating at least one diverter and at least two pneumatic devices of the at least two sending stations and the at least two receiving stations.

In another embodiment of the invention, a pneumatic tube carrier routing system is provided comprising a plurality of stations each comprising a pneumatic device; a plurality of diverters each routably connected to each of the plurality of stations via one or more pneumatic tube sectors, wherein each pneumatic tube sector is controlled independently from other pneumatic tube sectors by at least one pneumatic device; and a system control module in signal communication with the plurality of stations and the plurality of diverters for substantially simultaneously routing a plurality of carriers between the plurality of stations.

A method of the invention for automatically routing a pneumatic tube carrier from a first station comprising a first pneumatic device to a second station comprising a second pneumatic device comprises: receiving the carrier at the first station, wherein the first station is routably connected to a diverter via a first pneumatic tube sector; routing the carrier from the first station to the diverter via positive pressure created by the first pneumatic device in the first pneumatic tube sector; receiving the carrier at the diverter and shifting the carrier to be discharged at a second pneumatic tube sector routably connecting the diverter to the second station; and routing the carrier from the diverter to the second station via negative pressure created by the second pneumatic device in the second pneumatic tube sector.

In addition, the present invention provides a diverter for diverting a carrier in a pneumatic tube carrier routing system. In a preferred embodiment, the diverter comprises a first port connected to a first pneumatic tube sector; a second port connected to a second pneumatic tube sector; at least one robotic arm; and a movable tube connected to the at least one robotic arm for retaining the carrier; wherein the robotic arm shifts the movable tube to mate with the first port to receive the carrier, and wherein the robotic arm shifts the movable tube to mate with the second port to discharge the carrier. The movable tube may comprise two removable caps disposed on opposite ends thereof. The removable caps may be selectively removed using a linear actuator, a rotary actuator, a rail, a track, or a combination thereof. The robotic arm may be slidably connected at its first end to a robotic slider to shift the movable tube toward or away from at least one of the first port and the second port. The robotic arm may further comprise a rotary actuator for rotating the robotic arm or for bending the robotic arm to shift the movable tube from the first port to the second port. In addition, the robotic arm may comprise a linear actuator for extending or contracting the robotic arm to shift the movable tube from the first port to the second port. The robotic arm may be slidably connected to a circular rail disposed around the circumference of the movable tube. In an alternative embodiment, the robotic arm may be rotatably secured at its first end to a first bracket and rotatably secured at its second end to a second bracket, wherein the second bracket is secured to the movable tube. The various actuators used in the present invention may comprise linear actuators, rotary actuators, electrical actuators, pneumatic actuators, hydraulic actuators, combustion powered actuators, mechanical actuators, of any combination thereof.

BRIEF DESCRIPTION OF THE DRAWINGS

A further understanding of the invention can be obtained by reference to a preferred embodiment, along with alternative embodiments, set forth in the illustrations of the accompanying drawings, where like reference numbers indicate like elements throughout the drawings. Although the illustrated embodiment is merely exemplary of systems and methods for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the invention, reference is now made to the following drawings in which.

DETAILED DESCRIPTION OF THE INVENTION

The present invention may be understood more readily by reference to the following detailed description of preferred embodiment of the invention. However, techniques, systems, and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. Moreover, well known methods and procedures for both carrying out the objectives of the present invention and illustrating the preferred embodiment are incorporated herein but have not been described in detail as not to unnecessarily obscure novel aspects of the present invention.

It must be noted that, as used in the specification and the appended claims, the singular forms "a", "an", and "the" include plural referents unless the context clearly indicates otherwise.

Some elements of the present invention are illustrated as modules for performing described functions. While these modules may be described in terms of software implementations, any hardware, or combination of hardware and software may be used to implement the present invention without deviating from the scope or spirit thereof.

The pneumatic tube system of the present invention can be used to deliver medical products and documents in a hospital. It will be appreciated that although the pneumatic tube system is described as used in a hospital, the present invention are not limited to such use. For instance, the present invention could be used in any other businesses or enterprises where customized product delivery is desired. The present invention may also be used in, but not limited to, banks, retail stores, pharmacies, laboratories, or the like.

The present invention relates to a pneumatic tube delivery system and method for simultaneously transporting pneumatic carriers across a plurality of sending and receiving stations. The pneumatic tube system of the present invention includes a new type of a diverter and station, and does not use a central blower that controls the entire zone. Without the employment of a central blower, the pneumatic tube system of the present invention promotes faster travel time, increases the number of transaction per zone, reduces air abundance per zone, and the system cost is favorably reduced.

Figure 2:
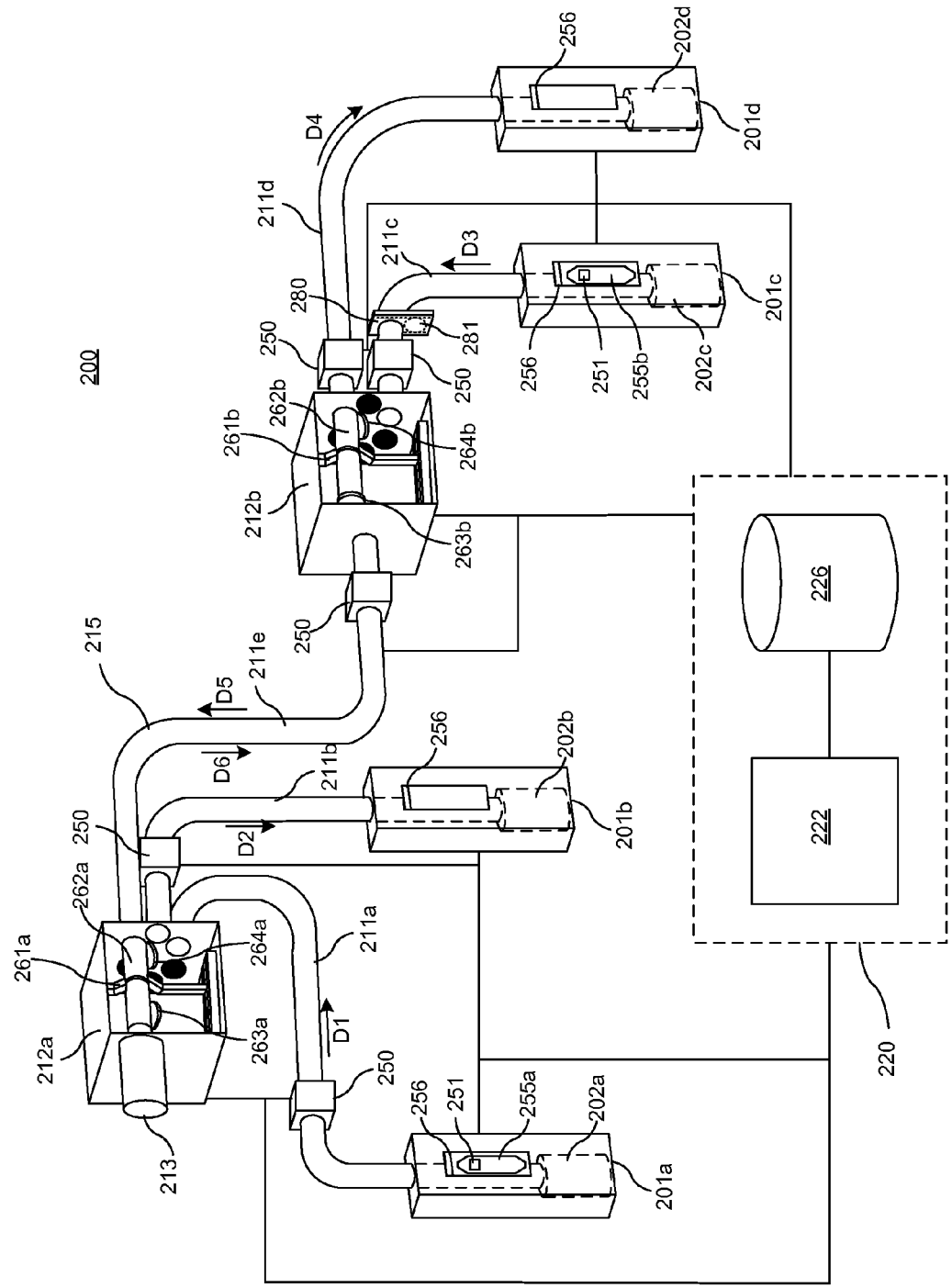
FIG. 2 is a diagram illustrating the pneumatic tube system according to a preferred embodiment of the invention.

Referring now to FIG. 2, there is shown a diagram illustrating a pneumatic tube system 200 according to an embodiment of the invention. The pneumatic tube system 200 utilizes, in one non-limiting embodiment, a plurality of pneumatic tube stations 201a, 201b, 201c, and 201d, for sending and receiving pneumatic carriers, such as carriers 255a and 255b. They are in communication with each other through pneumatic tubing 215 and a system control module 220 for initiating and sending of pneumatic carriers 255a and 255b. The pneumatic tube system 200 also includes one or more diverters 212a and 212b which direct the transportation of pneumatic carriers 255a and 255b between pneumatic tube stations 201a, 201b, 201c, and 201d. Diverters 212a and 212b are also in communication with the system control module 220. The configuration of the pneumatic tube system 200 shown in FIG. 2 is only exemplary. The pneumatic tube system 200 of the present invention can comprise any number of stations and diverters as required. In addition, pneumatic tubing 215 can be configured in any way required to interconnect the plurality of stations and diverters installed in a facility.

System control module 220 controls the operation of pneumatic tube system 200, reading, storing, and presenting data, and tracking the delivery of carriers in response to the collected data. The system control module 220 may include database module 226 in signal communication with computer control module 222. The pneumatic tube stations 201a, 201b, 201c, and 201d and diverters 212a and 212b are all in signal communication with, and controlled by, the system control module 220. The database module 226 may, for example, be a relational database, a flat file database, fixed length record database, or any other data storage mechanism known or as yet undiscovered in the art. Further, the database module 226 may reside on a stand-alone server, or the same machine as the computer control module 222. The computer control module 222 interprets the data in the database module 226 and generates commands in the form of signals to individual elements in the pneumatic tube system 200 to control the actions of the system 200. The computer control module 222 performs the function of a data manager and manages data by interpreting data stored in the database module 226 and sending routing commands to the pneumatic tube system 200 based on location data and delivery information collected from sending users at pneumatic tube stations 201a, 201b, 201c, and 201d. In one non-limiting embodiment, the computer control module 222 performs the functions of a data manager, while in another embodiment, there may be a separate module to serve as the data manager in order to interpret the data stored in the database module 226 and send routing commands to the computer control module 222, which then sends commands to the pneumatic tube system 200 based on location data and delivery information. For example, the system control module 220 may command the pneumatic tube system 200 to direct pneumatic tube station 201a to transport a carrier 255a through the pneumatic tube system 200 to pneumatic tube station 201d. Similarly, the diverters 212a and 212b may be signaled by the computer control module 222 to route a carrier 255a to a particular branch in the pneumatic tubing to be delivered to a desired pneumatic tube station.

The pneumatic tube stations 201a, 201b, 201c, and 201d, are substantially the same and may be utilized as either sending stations or receiving stations at the direction of the system control module 220. Although four pneumatic tube stations are illustrated, the pneumatic tube system 200 may be implemented with any number of pneumatic tube stations as necessary without deviating from the scope of the invention. Advantageously, the pneumatic tube system 200 does not use a central blower that controls the entire pneumatic tube system 200. Instead, pneumatic tube stations 201a, 201b, 201c, and 201d each include pneumatic devices 202a, 202b, 202c, and 202d to coordinate and direct the transportation of carriers 255a and 255b throughout the pneumatic tube system 200. In addition, one or more diverters in the pneumatic tube system 200, for example diverter 212a, may also comprise a pneumatic device 213 for transporting a carrier 255a between diverters, for example from diverter 212a to diverter 212b, or vice versa. Carriers 255a and 255b move through branches of the pneumatic tubing in the system under vacuum or pressure supplied by pneumatic devices 202a, 202b, 202c, 202d, and 213. The computer control module 222 sends signals to the pneumatic devices 202a, 202b, 202c, 202d, and 213 to transport the carriers 255a and 255b. As carriers 255a and 255b move through the system, the computer control module 222 controls the carriers' routing by transmitting commands to diverters 212a and 212b which change the position and/or direction of the carriers 255a and 255b. Pneumatic devices 202a, 202b, 202c, 202d, and 213 may comprise any device capable of generating positive and negative pressure in the pneumatic tubing, including, but not limited to a fan, a blower, a compressor, and the like. In a preferred embodiment, each pneumatic device 202a, 202b, 202c, 202d, and 213 comprise a sound-proof air compressor to eliminate noise so that it can be installed in sensitive locations, such as intensive care units or emergency departments within the hospital. In addition, each pneumatic device 202a, 202b, 202c, 202d, and 213 may be enclosed in padded material to minimize vibration.

Each pneumatic device 202a, 202b, 202c, 202d, and 213 is only responsible for transporting a carrier though a single pneumatic tube sector with which it is connected, such as sectors 211a, 211b, 211c, 211d, and 211e, respectively. Specifically, pneumatic device 202a is only responsible for transporting a carrier between pneumatic tube station 201a and diverter 212a through pneumatic tube sector 211a, pneumatic device 202b is only responsible for transporting a carrier between pneumatic tube station 201b and diverter 212a through pneumatic tube sector 211b, pneumatic device 202c is only responsible for transporting a carrier between pneumatic tube station 201c and diverter 212b through pneumatic tube sector 211c, pneumatic device 202d is only responsible for transporting a carrier between pneumatic tube station 201d and diverter 212b through pneumatic tube sector 211d, and pneumatic device 213 is only responsible for transporting a carrier between diverter 212a and diverter 212b through pneumatic tube sector 211e. As such, each pneumatic tube sector operates independently from other pneumatic tube sectors. This enables two carriers 255a and 255b to be transported simultaneously, reducing the air abundance that is required to operate the entire pneumatic tube system 200. For that reason, each pneumatic device 202a, 202b, 202c, 202d, and 213 required to transport a carrier in a single pneumatic tube sector can be compact and less powerful than a typical pneumatic system blower. This enables pneumatic devices 202a, 202b, 202c, 202d, and 213 to be small in size, lightweight, and less expensive. This also allows the pneumatic tube system 200 to be expanded with minimal alterations—simply by adding additional pneumatic tube sectors, diverters, and stations.

Figure 1:
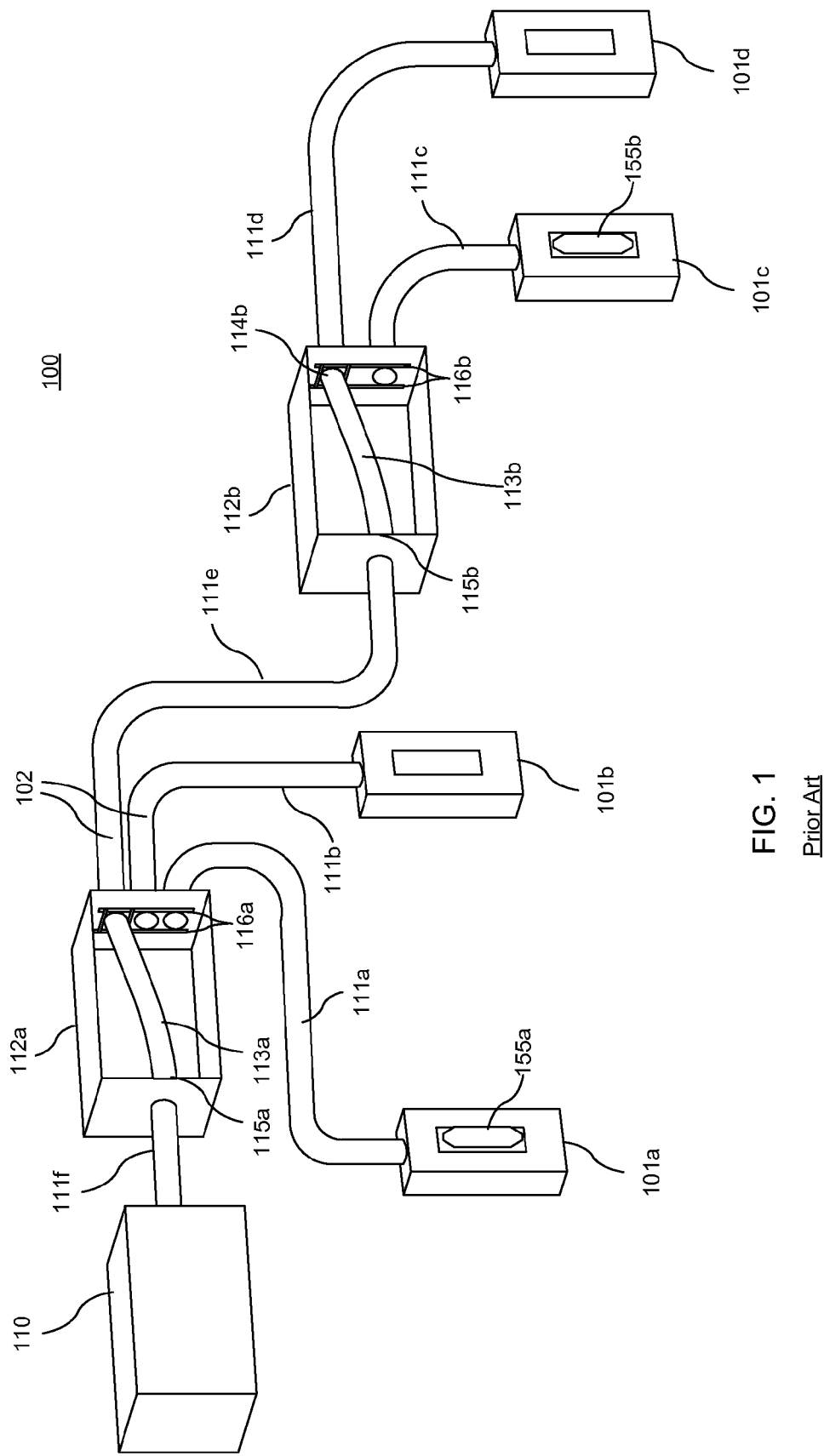
FIG. 1 is a diagram illustrating a prior art pneumatic tube system.

The pneumatic tube system 200 may be installed as a completely new system, or it may be incorporated into an existing system without major alterations, using existing pneumatic tubing, stations, and diverters, including diverters 112a and 112b shown in FIG. 1, with the addition of various devices, such as slide plates or barriers to temporarily isolate pneumatic tube sectors. For example, with reference to FIG. 1, pneumatic devices may be added to each station 101a, 101b, 101c, and 101d, blower 110 may be removed and a pneumatic device may be added to first end 115a of diverter 112a. Finally, slide plates (such as slide plate 280 described in more detail below with reference to FIG. 2) may be included at first ends 115a and 115b and second ends 114a and 114b of flexible tubes 113a and 113b, respectively, to selectively isolate tube sectors 111a, 111b, 111c, 111d, and 111e.

Alternatively, the pneumatic tube system 200 of the present invention may utilize diverters in a form of gripping gates 212a and 212b (described in more detail below), which use robotic arms 261a and 261b and movable tubes 262a and 262b, respectively, to grab a carrier at one pneumatic tube port and shift it to another pneumatic tube port to its next destination. Gripping gates 212a and 212b are much smaller in size than conventional diverters, such as diverters 112a and 112b shown in FIG. 1. Movable tubes 262a and 262b also comprise a pair of caps 263a, 264a and 263b, 264b, respectively, disposed on each end thereof, which selectively open and close movable tubes 262a and 262b.

In operation, in order to initialize a first transaction or shipment of carrier 255a from pneumatic tube station 201a to pneumatic tube station 201b, the sending user enters information, such as destination information, into the sending pneumatic tube station 201a that will be used to manage the carrier's routing and delivery through the pneumatic tube system 200. The sending user prepares the contents of the carrier 255a for shipment. The contents of the carrier 255a may be, for example, prescriptions, blood samples, patient file information, and the like. The computer control module 222 receives the destination information of a particular carrier 255a and determines the necessary command to route the carrier 255a properly. The computer control module 222 sends routing commands to various components of the pneumatic tube system 200 to control the operations of the system. In particular, the computer control module 222 instructs the diverter 212a to open cap 264a of movable tube 262a, while cap 263a remains closed, and to shift movable tube 262a to a pneumatic tube port corresponding to pneumatic tube sector 211a. The computer control module 222 instructs the pneumatic device 202a to create positive pressure in pneumatic tube sector 211a. Positive pressure is created in pneumatic tube sector 211a that does not affect the pressures within any of the remainder sectors of the pneumatic tube system 200. The other pneumatic tube sectors 211b, 211c, 211d, and 211e may have positive, negative, or no pressure. The shifting of movable tube 262a in diverter 212a and the operation of the pneumatic device 202a can occur simultaneously. After the carrier 255a is placed in the pneumatic tube station 201a it is transmitted in direction D1 by being pushed through pneumatic tube sector 211a into movable tube 262a of diverter 212a. The computer control module 222 then instructs the diverter 212a to close cap 264a, to shift movable tube 262a to a pneumatic tube port corresponding to pneumatic tube sector 211b, and to open the cap 264a. Alternatively, cap 264a may remain open during shifting. Computer control module 222 instructs pneumatic device 202b of receiving pneumatic tube station 201b to create negative pressure in pneumatic tube sector 211b causing partial vacuum to build between diverter 212a and pneumatic tube station 201b. As a result, carrier 255a is pulled in direction D2 from movable tube 262a of diverter 212a through pneumatic tube sector 211b into pneumatic station 201b. Again, the shifting of movable tube 262a in diverter 212a and the operation of the pneumatic device 202b can occur simultaneously. In addition, the computer control module 222 may instruct pneumatic devices 202a and 202b to create positive and negative pressures, respectively, simultaneously. Consequently, as soon as the carrier 255a is inserted into and shifted by movable tube 262a of diverter 212a, it is transmitted to pneumatic tube station 201b without any wait time.

A second transaction or shipment can be initiated in a similar manner from pneumatic tube station 201c to pneumatic tube station 201d through diverter 212b and pneumatic tube sectors 211c and 211d in directions D3 and D4, respectively. Advantageously, the first transaction and the second transaction can occur simultaneously. Pneumatic tube system 200 does not have to wait for the first transaction to finish in order to initiate the second transaction. The second transaction occurs independently of the first transaction because the pneumatic tube sectors are isolated and controlled by different pneumatic devices. This operation allows users to send and receive more than two carriers within one zone. Greater number of stations and diverters in one zone result in a greater number of possible transactions to occur simultaneously. Pneumatic tube system 200 of the present invention effectively eliminates the zone requirement that is currently necessary in order to provide simultaneous transactions. This reduces the number of tubing and components used in the system. Although in other non-limiting embodiments, the system of the present invention can be incorporated into an existing multiple zone configuration with the inclusion of any number of sending and receiving stations without deviating from the scope of the present invention.

In another example, a third and fourth transactions can occur simultaneously, a third transaction carrying out from pneumatic tube station 201a to pneumatic tube station 201d, and a fourth transaction carrying out from pneumatic tube station 201c to pneumatic tube station 201b. In order to initialize the third transaction, the computer control module 222 determines the necessary command to route the carrier 255a properly. The computer control module 222 instructs the diverter 212a to open cap 264a of movable tube 262a, while cap 263a remains closed, and to shift movable tube 262a to a pneumatic tube port corresponding to pneumatic tube sector 211a. The computer control module 222 instructs the pneumatic device 202a to create positive pressure in pneumatic tube sector 211a. After the carrier 255a is placed in the pneumatic tube station 201a it is transmitted in direction D1 by being pushed through pneumatic tube sector 211a into movable tube 262a of the diverter 212a. The computer control module 222 then instructs the diverter 212a to open cap 263a, while cap 264a remains open, and to shift movable tube 262a to a pneumatic tube port corresponding to pneumatic tube sector 211e at one end and with a port corresponding with pneumatic device 213 at the opposite end. Computer control module 222 instructs pneumatic device 213 of diverter 212a to create positive pressure in pneumatic tube sector 211e causing positive pressure to build between diverter 212a and diverter 212b. As a result, carrier 255a is pushed in direction D6 from movable tube 262a of diverter 212a through pneumatic tube sector 211e. The shifting of movable tube 262a and the operation of the pneumatic device 213 can occur simultaneously. Diverter 212b is instructed to close cap 264b, open cap 263b, and shift movable tube 262b to correspond to the port of pneumatic tube sector 211e to receive carrier 255a. Diverter 212b is then instructed to close cap 263b, shift the movable tube 262b to the port of pneumatic tube sector 211d, and open cap 264b. Computer control module 222 may simultaneously instruct pneumatic device 202d to create negative pressure in pneumatic tube sector 211d to pull pneumatic carrier 255a in direction D4 to pneumatic station 201d.

In a similar manner, a fourth transaction can be initiated to send carrier 255b from sending pneumatic tube station 201c to receiving pneumatic tube station 201b in directions D3, D5, and D2. If the both pneumatic carriers 255a and 255b arrive at diverter 212b, then carrier 255b is temporarily held at the entrance to the diverter 212b in pneumatic tube sector 211c until the diverter 212b finishes to shift and emit carrier 255a to its destination. Diverter 212b then executes the carrier 255b sent from pneumatic tube station 201c. Carrier 255b may be temporarily held at the entrance to the diverter 212b in a plurality of ways. For example, a slide plate 280 may be used to block the entrance to the diverter 212b by using a plate 281 that slides to block the carrier 255b from being delivered to the diverter 212b. In a preferred embodiment, the pneumatic tube system 200 operates on a first-come-first-serve basis. Alternatively, the computer control module 222 may selectively hold carriers within the pneumatic tube system 200 based on designations inputted by the user at the sending station indicating the priority of the delivery. As such, carriers of higher priority designations will not be held, instead carriers with lower priority designations will be held so that the diverter can first execute the delivery of the carriers with higher priority designations.

To effectively track the plurality of carriers that are being transmitted through the pneumatic tube system 200, pneumatic tube stations 201a, 201b, 201c, and 201d may comprise tag readers or optical sensors 256 in communication with the system control module 220. Tag readers or optical sensors 256 are used to read, or otherwise sense, the ID tags 251 disposed on pneumatic carriers 255a and 255b, and/or ID tags associated with the carrier contents or payload, sending user's ID, or the receiving user's ID. The identifying tag readers 256 may also read and store a unique ID tag associated with the sending station and delivery station. The system control module 220 may receive carrier information, including identifier and carrier delivery information, from the tag readers or optical sensors 256, log the carrier information into a database module 226, and determine the appropriate actions to be performed on the pneumatic tube system 200. For example, the system control module 220 may use the information from identifying tag readers 256 at delivery station 201a to determine to which delivery station a carrier 255a will be routed.

In one useful embodiment, an identifying tag reader 256 may read the ID tag of objects using an optical scanning system to read bar codes. Alternatively, an identifying tag reader 256 may employ an optical scanning system to identify characters and read and store the ID or identifier information of various objects. In another embodiment, the identifying tag reader 256 may identify objects using RFID or other radio frequency technology. Additionally, any other identification technology known, or as yet undiscovered, may be used within the scope of the present invention.

The pneumatic tube system 200 may further include a plurality of inline identifying tag readers or optical sensors 250 configured to read or sense ID tags 251 on the pneumatic carriers 255a and 255b as they are transported through pneumatic tubing 215 of the pneumatic tube system 200. The inline identifying tag readers or optical sensors 250 may be implemented, for example, through a window or a section of the pneumatic tubing, through an RFID antenna disposed on a recess section of the pneumatic tubing, through an optical sensor disposed in the pneumatic tubing, or in any similar manner. The inline identifying tag readers or optical sensors 250 are in signal communication with the system control module 220.

In one embodiment of the invention, the ID tags 251 may be used to record the locations and identify the pneumatic carriers 255a and 255b as they travel through the pneumatic tubing 215. The system control module 220 receives carrier location information from inline identifying tag readers or optical sensors 250 disposed throughout the pneumatic tube system 200 and log this information into a database module 226. The system control module 220 uses the information provided by inline identifying tag readers or optical sensors 250 to keep track of each pneumatic carriers' 255a and 255b locations as they move through the pneumatic tube system 200. The system control module 220 may generate records to show that carriers 255a and 255b passed an inline identifying tag reader or sensor 250 at a certain time. This creates an auditable trail indicating a chain of custody, allowing the user to know where the pneumatic carriers 255a and 255b and its contents have been and where they are going. These records may be used to ensure that carriers 255a and 255b are routed correctly and in the correct order. This also allows the system control module 220 to identify which carriers to hold within the pneumatic tube system 200 to allow other carriers to travel. Location recordation may also be used to troubleshoot and initiate error notifications, such as a stuck or lost carrier, or may be used to guarantee or verify a timely delivery for perishable contents (e.g., drugs or blood contents that must be refrigerated). Additionally, reports on chain of custody of carriers may be generated to keep record of who has a specific carrier at a specific point in time and where that carrier is located.

In operation, in order to initialize a shipment of carrier 255a from pneumatic tube station 201a to pneumatic tube station 201d, the sending user enters information into the sending pneumatic tube station 201a that will be used to manage carrier routing and delivery through the pneumatic tube system 200. The sending user prepares the contents of the carrier 255a for shipment. Then, the sending user may, in some non-limiting examples, use tag reader 256 to scan the ID tag 251, scan the sending user ID, the ID of the desired receiving pneumatic tube station 201d. In other embodiment, the user can use a handheld PDA (not shown) to implement scanning. The scanned information from tag reader 256 or the handheld PDA is transmitted to the system control module 220 where it is stored in the database module 226 and interpreted by the computer control module 222. In another useful embodiment, a more passive system may be used for the scanning of the delivery information. The identifier tags may be RFID tags, which can be read by an RFID identifying tag reader 256. In such an embodiment, the sending user at the sending pneumatic tube station 201a may move near the RFID identifying tag reader 256 while holding the carrier 255a and its contents, and the reader 256 will read and send the ID information from the sender, the carrier 255a, and the contents inside the carrier 255a to the system control module 220. Thus, sending users may advantageously avoid physically scanning each identifier tag to obtain delivery information. The computer control module 222 then determines the destination of a particular carrier 255a, and the necessary command to route the carrier 255a properly. The computer control module 222 sends routing commands to the pneumatic tube system 200 to control the operations of the system. The computer control module 222 further receives information from inline tag readers 250 to ensure that the carrier is routed properly. After the computer control module 222 routes the carrier 255a through the pneumatic tubing 215 via diverters 212a and 212b, the carrier 255a travels to the receiving pneumatic tube station 201d. At this pneumatic tube station 201d, the carrier 255a is opened and the contents of the carrier 255a are extracted. The ID of the empty carrier 255a may then be scanned with a handheld PDA to keep record of which of the plurality of carriers are available for other shipments.

Figure 3A:
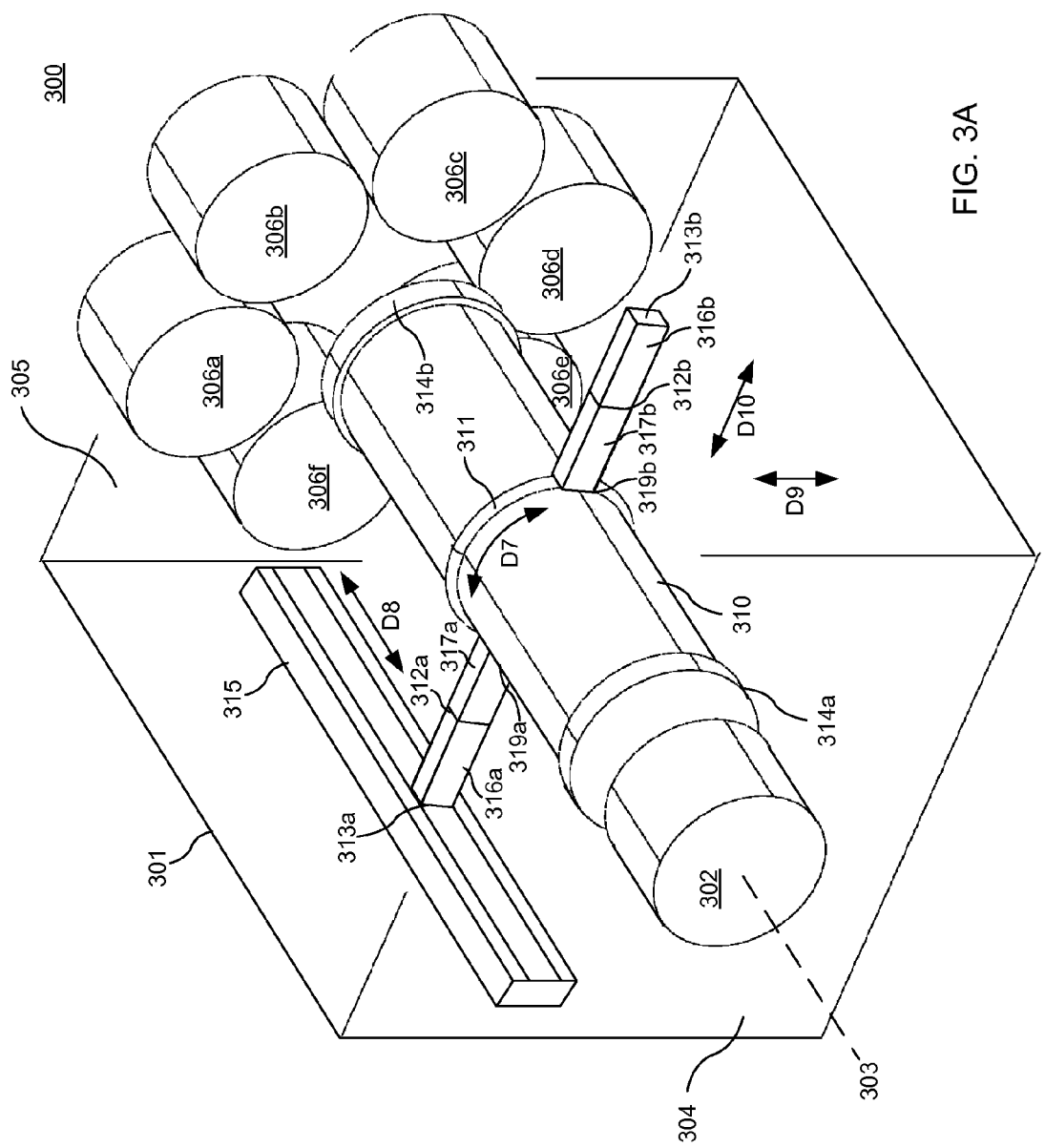
FIGS. 3A-3C are diagrams of a diverter in various operating positions according to a preferred embodiment of the invention.
Figure 3B:
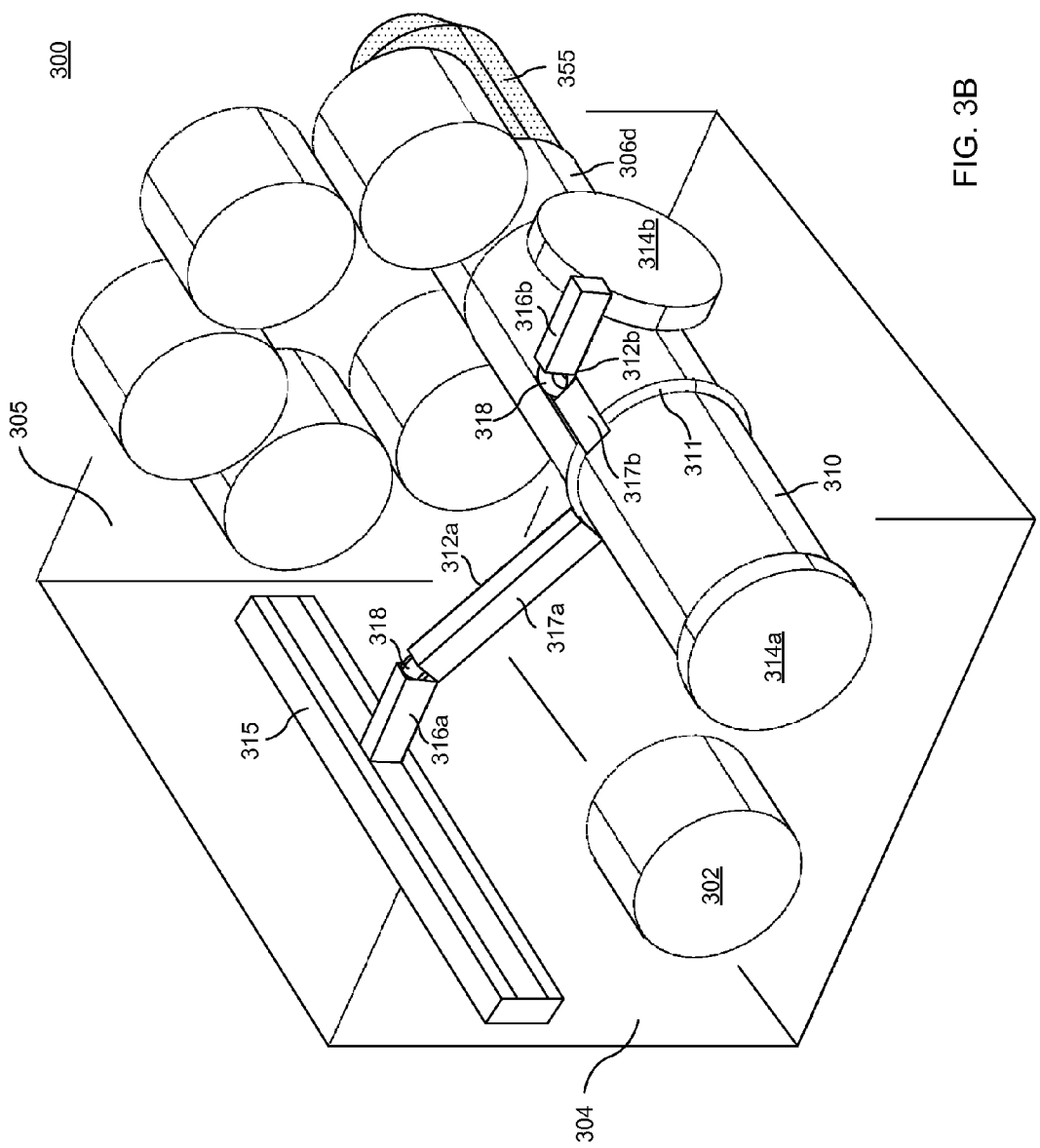

Referring now to FIG. 3A, there is shown a diverter 300, such as a diverter 212b, according to an embodiment of the present invention. Diverter 300 is preferably enclosed in casing 301 extending from a first end 304 to a second end 305. Diverter 300 may comprise a single pneumatic tube port 302 at its first end 304 and a plurality of pneumatic tube ports 306a, 306b, 306c, 306d, 306e, and 306f at its second end 305. Although a single pneumatic tube port is shown at the first end and six pneumatic tube ports are shown at the second end, first end 304 and second end 305 of diverter 300 may comprise any number of ports. Pneumatic tube ports 302, 306a, 306b, 306c, 306d, 306e, and 306f are connected to pneumatic tubing, as shown in FIG. 2. Any unused pneumatic tube ports may be blocked off, as shown in FIG. 2. Diverter 300 further comprises a movable tube 310 having a circular rail or track 311 disposed around its circumference and two removable caps 314a and 314b disposed on its opposing ends. Two robotic arms 312a and 312b are slidably secured at their first ends 313a and 313b, respectively, to robotic sliders 315 (only a single robotic slider 315 is shown for clarity) and slidably secured at their second ends 319a and 319b, respectively, to the circular rail 311. Robotic arms may be secured to the circular rail or track 311 using any slidable device known in the art, including rings, notches, bearings, wheels, or the like. Although two robotic arms are illustrated, diverter 300 may comprise a single robotic arm or more than two robotic arms, without departing from the scope of the present invention. Arms 312a and 312b are adapted to linearly slide in direction D8 at their first ends 313a and 313b, respectively, along robotic sliders 315. Robotic sliders 315 may be secured to the casing 301 of the diverter 300. Similarly, arms 312a and 312b are adapted to rotatably slide in direction D7 at their second ends 319a and 319b, respectively, along circular rail 311 about axis 303 of the movable tube 310. Robotic sliders 315 may comprise electrical robotic sliders known in the art. Arms 312a and 312b comprise first portions 316a and 316b attached to second portions 317a and 317b via rotary actuators 318 (shown in FIG. 3B), respectively. Rotary actuators 318 allow first portions 316a and 316b to rotate with respect to second portions 317a and 317b allowing the arms 312a and 312b to bend as shown in FIG. 3B. In addition, second portions 317a and 317b preferably comprise linear actuators allowing the arms 312a and 312b to extend and contract (as shown in FIG. 3B). The various actuators used in the present invention may be any actuators know in the art, including, but not limited to, linear actuators, rotary actuators, electrical actuators, pneumatic actuators, hydraulic actuators, combustion powered actuators, mechanical actuators comprising gears, rails, pulleys, chains or other devices, or any combinations thereof. The size and shape of the actuators can be modified and customized to fit into the diverter. Actuator sensors (not show) are preferably used to help to control the actuators' movement and to allow the movable tube 310 to correctly align with the desired pneumatic tube port.

The combination of the robotic components allows movable tube 310 to be shifted to any desired location within the diverter 300 to mate with any one of the pneumatic tube ports. Specifically, robotic sliders 315 allow movable tube 310 to move horizontally within the diverter 300 in direction D8, a combination of the rotary actuators 318 in robotic arms 312a and 312b and circular rail 311 allow movable tube 310 to move vertically within the diverter 300 in direction D9, and the linear actuators in second portions 317a and 317b of robotic arms 312a and 312b allow movable tube 310 to move horizontally within the diverter 300 in direction D10, which is perpendicular to direction D8. In a preferred embodiment, each movement and position of the actuators is preprogrammed to define a location that mates the movable tube 410 with one of the pneumatic tube ports. When diverter 300 is instructed to receive a carrier in pneumatic tube port 306d, for example, the movable tube 310 is automatically shifted to the preprogrammed position.

Figure 3C:
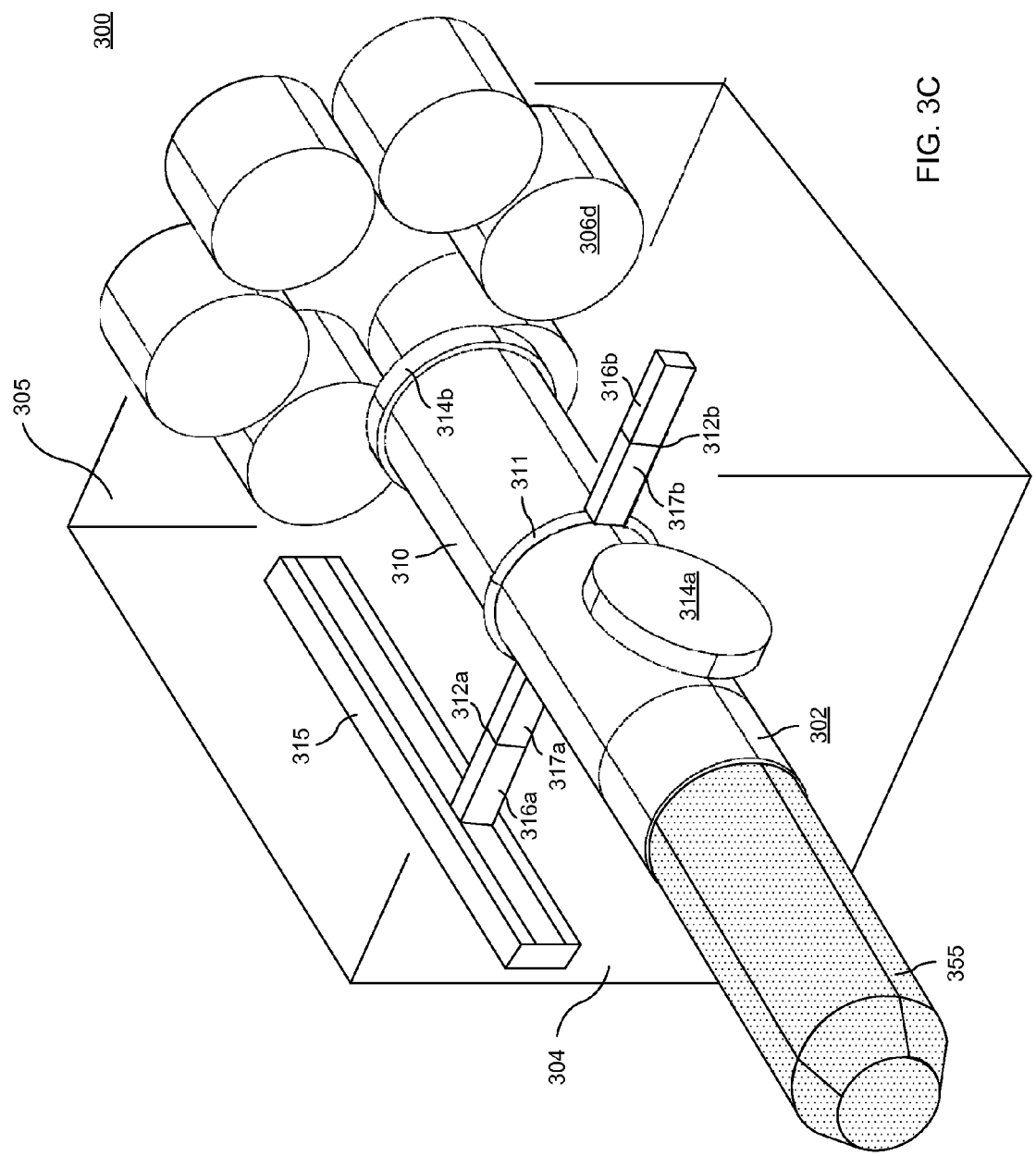

In operation, to receive a pneumatic carrier at pneumatic tube port 306d, movable tube 310 is shifted from the position shown in FIG. 3A to a position shown in FIG. 3B where movable tube 310 is aligned with pneumatic tube port 306d. Specifically, robotic arms 312a and 312b are bent at required angles, second portion 317a of arm 312a extends and second portion 317b of arm 312b contracts to bring movable tube 310 in alignment with pneumatic tube port 306d. This causes the second ends 319a and 319b of arms 312a and 312b, respectively, to slide along circular rail 311 towards each other. Then cap 314b is removed (as will be later described) to open the movable tube 310. Arms 312a and 312b then slide along robotic sliders 315 toward second end 305 of diverter 300 to bring the opening of movable tube 310 in contact with the pneumatic tube port 306d. After pneumatic carrier 355 enters the movable tube 310, as shown in FIG. 3B, arms 312a and 312b slide along robotic sliders 315 toward first end 304 of diverter 300 and the cap 314b is replaced to close the movable tube 310. To discharge the pneumatic carrier 355 into pneumatic tube port 302, movable tube 310 is shifted from the position shown in FIG. 3B to a position shown in FIG. 3C, in a similar manner described above, where movable tube 310 is aligned with pneumatic tube port 302. Cap 314a is removed and arms 312a and 312b slide along robotic sliders 315 toward first end 304 of diverter 300 to bring the opening of movable tube 310 in contact with the pneumatic tube port 302 to allow pneumatic carrier 355 to exit as shown in FIG. 3C.

Figure 4A:
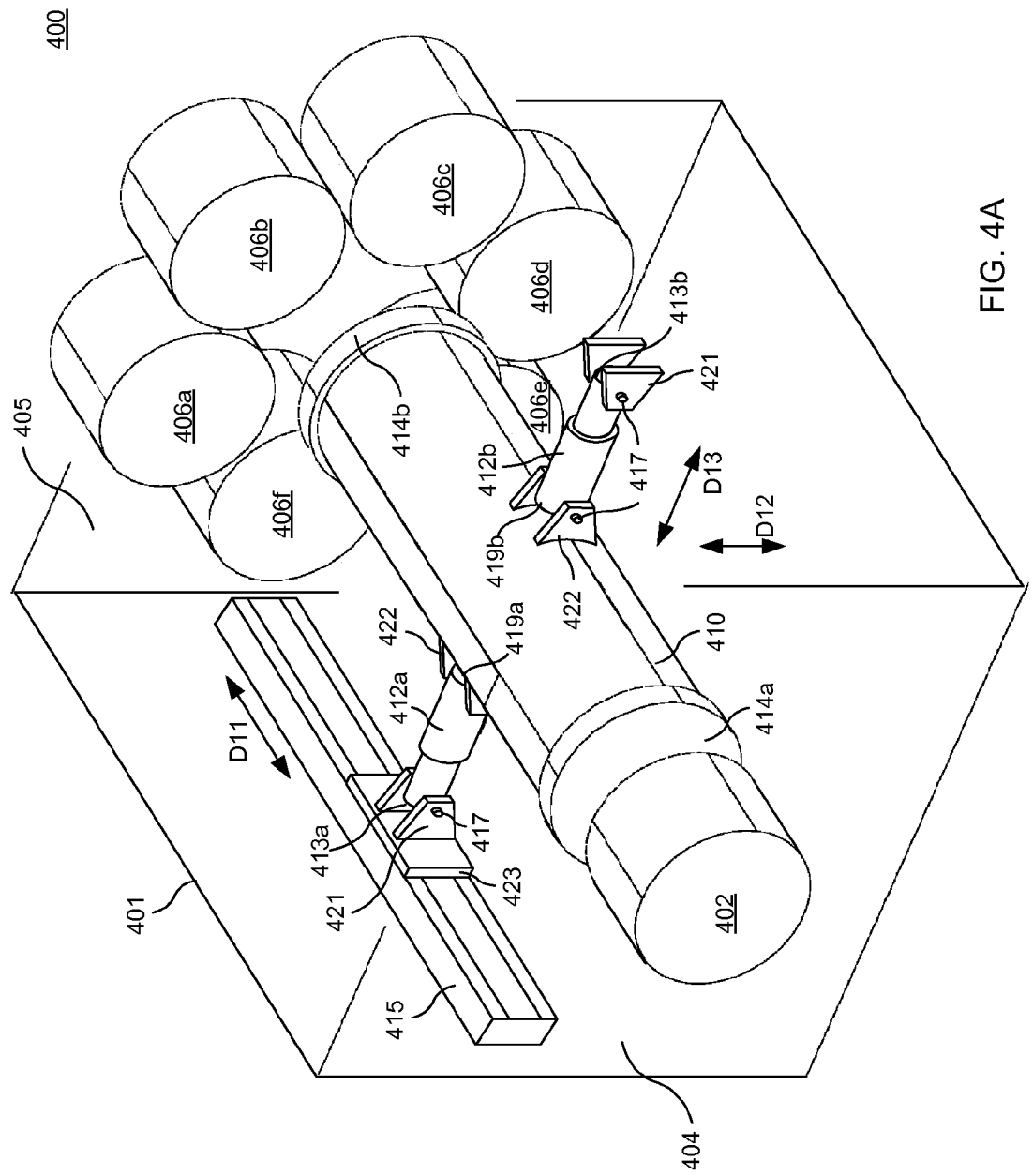
FIGS. 4A-4B are diagrams of a diverter in various operating positions according to an alternative embodiment of the invention.
Figure 4B:
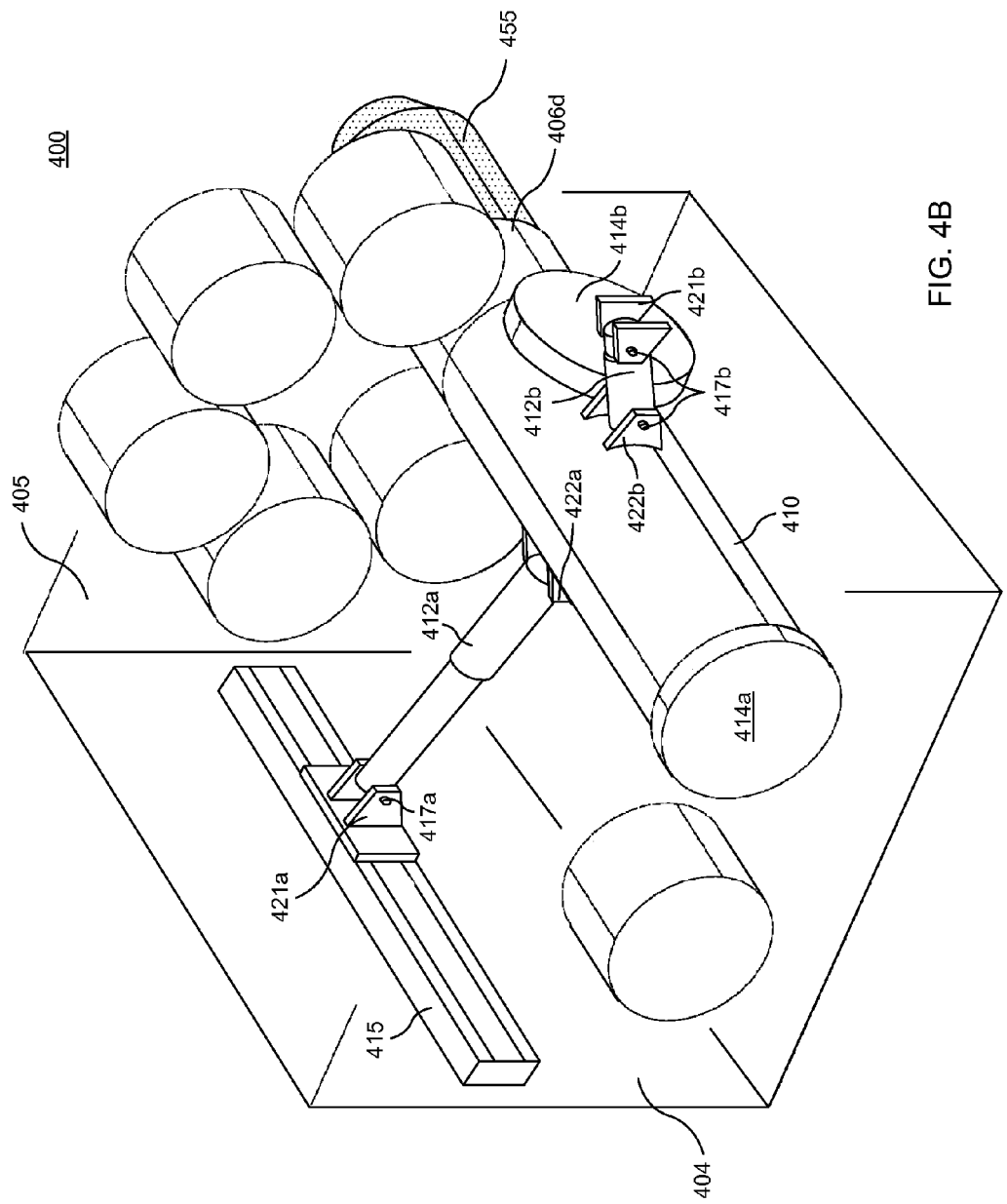
Figure 5D:
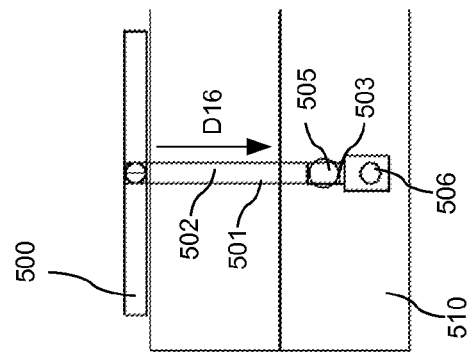
FIGS. 5A-5D are diagrams of a cap and a movable tube of a diverter in various operating positions according to a preferred embodiment of the invention.
Figure 5C:
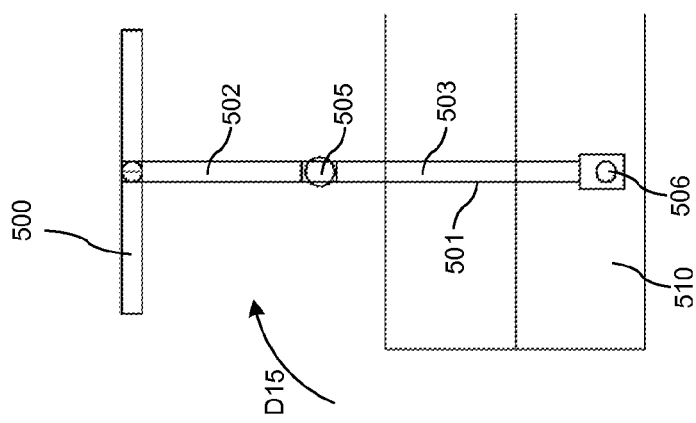
Figure 5B:
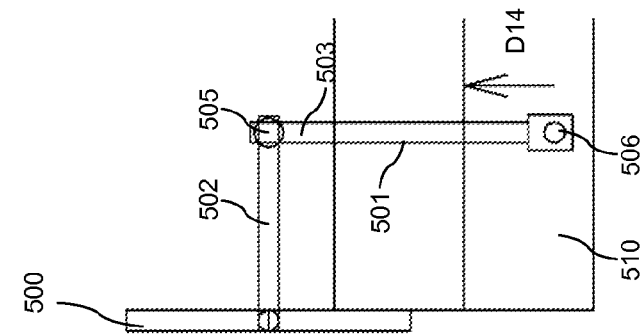
Figure 5A:
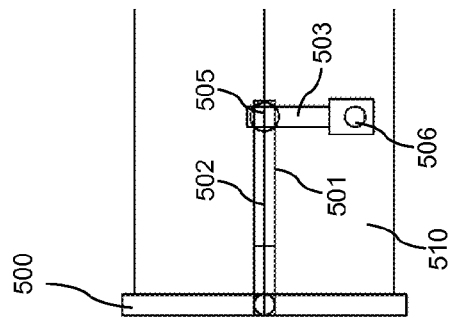

An alternative embodiment of the diverter is illustrated in FIGS. 4A and 4B. Diverter 400 is preferably enclosed in casing 401 extending from a first end 404 to a second end 405. Diverter 400 may comprise a single pneumatic tube port 402 at its first end 404 and a plurality of pneumatic tube ports 406a, 406b, 406c, 406d, 406e, and 406f at its second end 405. Although a single pneumatic tube port is shown at the first end and six pneumatic tube ports are shown at the second end, first end 404 and second end 405 of diverter 400 may comprise any number of ports. Pneumatic tube ports 402, 406a, 406b, 406c, 406d, 406e, and 406f are connected to pneumatic tubing, as shown in FIG. 2, with any unused pneumatic tube ports blocked off. Diverter 400 further comprises a movable tube 410 comprising two removable caps 414a and 414b disposed on its opposing ends. Two robotic arms 412a and 412b are rotatably secured at their first ends 413a and 413b, respectively, to brackets 421 and rotatably secured at their second ends 419a and 419b, respectively, to brackets 422. Brackets 421 and 422 are operated using rotary actuators 417 to allow the rotation of the robotic arms 412a and 412b with respect to the brackets 421 and 422. In turn, brackets 421 are slidably secured to robotic sliders 415 (only a single robotic slider 415 is shown for clarity) allowing robotic arms 412a and 412b to linearly slide in direction D11 along robotic sliders 415. Brackets 421 may be disposed on a backing plate 423 that slides on robotic slider 415. Robotic sliders 415 may be secured to the casing 401 of the diverter 400. Brackets 422 are secured to movable tube 410. Robotic arms 412a and 412b preferably comprise linear actuators allowing the arms 412a and 412b to extend and contract (as shown in FIG. 4B). In addition to the linear actuators, a rotary table known in the art (not shown) may be connected around the movable tube 410 (similarly as the circular rail 311 is attached to movable tube 310). Brackets 422 may be attached to the rotary table to provide the movable tube 410 more rotational and smoother movement. The combination of the robotic components allows movable tube 410 to shift to any desired location within the diverter 400 to mate with any of the pneumatic tube ports. Specifically, robotic sliders 415 allow movable tube 410 to move horizontally within the diverter 400 in direction D11, brackets 421 and 422 and rotary actuators 417 allow movable tube 410 to move vertically within the diverter 400 in direction D12, and linear actuators of arms 412a and 412b allow movable tube 410 to move horizontally within the diverter 400 in direction D13, which is perpendicular to direction D11.

In operation, to receive a pneumatic carrier at pneumatic tube port 306d, movable tube 410 is shifted from the position shown in FIG. 4A to a position shown in FIG. 4B where movable tube 410 is aligned with pneumatic tube port 406d. Specifically, robotic arm 412a extends and robotic arm 412b contracts, and substantially simultaneously, arms 412a and 412b are rotated in a downward direction with respect to brackets 421 and in an upward direction with respect to brackets 422. Then cap 414b is removed (as will be later described) to open the movable tube 410. Arms 412a and 412b then slide along robotic sliders 415 toward second end 405 of diverter 400 to mate the opening of movable tube 410 with pneumatic tube port 406d. After pneumatic carrier 455 enters the movable tube 410, as shown in FIG. 4B, the movable tube shifts in a similar manner to a desired pneumatic tube port to be discharged.

FIGS. 5A-5D illustrate an embodiment of the cap 500, such as cap 314a shown in FIG. 3A. Cap 500 may comprise two oppositely disposed robotic arms 501. Each robotic arm 501 is connected at its one end to cap 500 and at its opposite end to movable tube 510 via a retaining member 506. Robotic arm 501 comprises first and second portions 502 and 503 interconnected via a rotary actuator 505. In a preferred embodiment, second portion 503 comprises a linear actuator allowing the second portion 503 to extend and contract. In operation, to open the movable tube 510, the linear actuator of the second portion 503 extends the second portion 503 in direction D14, raising the cap 500 above the movable tube 510. Then, the rotary actuator 505 rotates the first portion 502 and cap 500 substantially 90 degrees with respect to the second portion 503 in direction D15. Finally, the linear actuator of the second portion 503 contracts the second portion 503 in direction D16 causing the cap 500 to sit against a side surface of the movable tube 510.

Figure 6B:
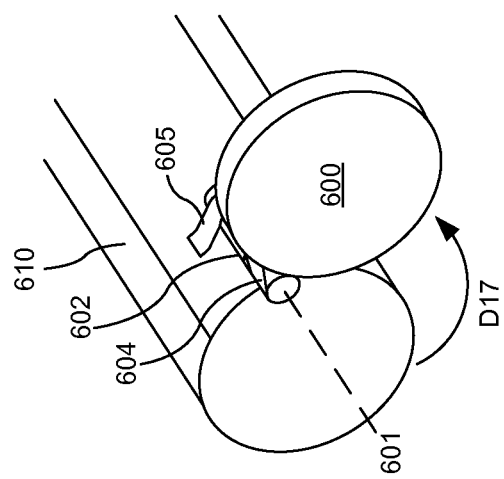
FIGS. 6A-6B are diagrams of a cap and a movable tube of a diverter in various operating positions according to an alternative embodiment of the invention.
Figure 6A:
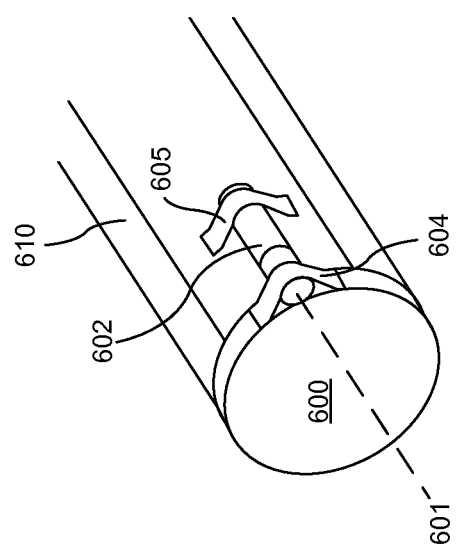

In an alternative embodiment, as shown in FIGS. 6A and 6B, cap 600 may be rotated in direction D17 about axis 601 parallel with the movable tube 610 to open the movable tube 610. Cap 600 comprises a rotary actuator 602 attached to the cap 600 via retaining member 604 and to the movable tube 610 via retaining member 605. To remove the cap 600, the rotary actuator rotates in direction D17 about axis 601. In another alternative embodiment, a sliding mechanism (not shown) known in the art, such as rails or tracks 116a shown in FIG. 1, may be attached to cap 600 to slidably open and close movable tube 610. In yet another alternative embodiment, instead of opening and closing the movable tube, the pneumatic tube ports may be selectively opened and closed using movable caps or slide plates described herein, or similar mechanisms.

While the invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the invention is capable of being embodied in other forms without departing from its essential characteristics.

The invention claimed is:

1. A pneumatic tube carrier routing system comprising:
a first station comprising a first pneumatic device;
a diverter routably connected to the first station via a first pneumatic tube sector; and
a second station comprising a second pneumatic device and routably connected to the diverter via a second pneumatic tube sector;
wherein the first pneumatic device creates positive pressure in the first pneumatic tube sector to route a carrier from the first station to the diverter, wherein the diverter receives the carrier from the first pneumatic tube sector and shifts the carrier to be discharged at the second pneumatic tube sector, and wherein the second pneumatic device creates negative pressure in the second pneumatic tube sector to route said carrier from the diverter to the second station;
wherein said diverter comprises at least one robotic arm to shift said carrier from a first port leading to the first pneumatic tube sector to a second port leading to the second pneumatic tube sector, and a movable tube connected to the at least one robotic arm for retaining said carrier; and
wherein said at least one robotic arm is rotatably and pivotably secured at a first end to a first bracket and rotatably secured at a second end to a second bracket, wherein said second bracket is secured to said movable tube.

2. The system according to claim 1 further comprising a system control module in signal communication with the first station, the diverter, and the second station; wherein the system control module is configured to receive a command to route a carrier from the first station to the second station; and wherein in response to the command the system control module activates the first pneumatic device, the second pneumatic device, and the diverter.

3. The system according to claim 1, wherein at least one of the first pneumatic device and the second pneumatic device is selected from the group consisting of a fan, a blower, a compressor, and a sound-proof air compressor.

4. The system according to claim 1, wherein at least one of the first pneumatic device and the second pneumatic device is enclosed in a padded material to minimize vibration.

5. The system according to claim 1, wherein said diverter comprises a third pneumatic device to create positive or negative pressure in a third pneumatic tube sector routably connecting said diverter to at least one of a third station and a second diverter.

6. The system according to claim 1, wherein said movable tube comprises two removable caps disposed on opposite ends of the movable tube.

7. The system according to claim 6, wherein the removable caps are selectively removed using at least one of a linear actuator, a rotary actuator, a rail, a track, or a combination thereof.

8. The system according to claim 1, wherein said at least one robotic arm is slidably connected at its first end to a robotic slider to shift said movable tube toward or away from at least one of the first port and the second port.

9. The system according to claim 1, wherein said at least one robotic arm comprises a rotary actuator for rotating said robotic arm or for bending said robotic arm to shift said movable tube from the first port to the second port.

10. The system according to claim 1, wherein said at least one robotic arm comprises a linear actuator for extending or contracting said robotic arm to shift said movable tube from the first port to the second port.

11. The system according to claim 1, wherein said movable tube comprises a circular rail disposed around a circumference of the movable tube; and wherein said at least one robotic arm is slidably connected to said circular rail.

12. The system according to claim 1, wherein said at least one robotic arm comprises at least one actuator selected from the group consisting of a linear actuator, a rotary actuator, an electrical actuator, a pneumatic actuator, a hydraulic actuator, a combustion powered actuator, a mechanical actuator, of a combination thereof.

13. The system according to claim 1, wherein at least one of the first station and the second station comprises a reader.

14. The system according to claim 13, wherein the reader is configured to read tags consisting of at least one of an optically scannable identifier tag and a Radio Frequency Identification ("RFID") tag.

15. The system according to claim 13, wherein the reader is configured to capture information associated with at least one of a carrier contents ID, a carrier ID, a sending user ID, a sending station ID, a receiving station ID, or a combination thereof.

16. The system according to claim 1, wherein at least one of the first pneumatic tube sector and the second pneumatic tube sector comprises a reader configured to capture information associated with a carrier ID as the carrier is transported through the at least one of the first pneumatic tube sector and the second pneumatic tube sector.

17. The system according to claim 1 further comprising a slide plate to hold the carrier at an entrance to the diverter.

18. A pneumatic tube carrier routing system comprising:
a first station comprising a first pneumatic device;
a diverter comprising a second pneumatic device, a first port leading to a first pneumatic tube sector routably connecting the diverter to the first station, and a second port leading to a second pneumatic tube sector routably connecting the diverter to at least one of a second station and a second diverter;
wherein the first pneumatic device creates positive pressure in the first pneumatic tube sector to route a carrier from the first station to the diverter, wherein the diverter receives the carrier at the first port and shifts the carrier from the first port to the second port, and wherein the second pneumatic device creates positive pressure in the second pneumatic tube sector to route the carrier from the diverter to the at least one of the second station and the second diverter;
wherein said diverter comprises at least one robotic arm to shift said carrier from a first port leading to the first pneumatic tube sector to a second port leading to the second pneumatic tube sector, and a movable tube connected to the at least one robotic arm for retaining said carrier; and
wherein said at least one robotic arm is rotatably and pivotably secured at a first end to a first bracket and rotatably secured at a second end to a second bracket, wherein said second bracket is secured to said movable tube.

* * * * *